Feb. 9, 1943.   H. R. SUMMERHAYES   2,310,753
PROTECTIVE SYSTEM
Filed June 27, 1941
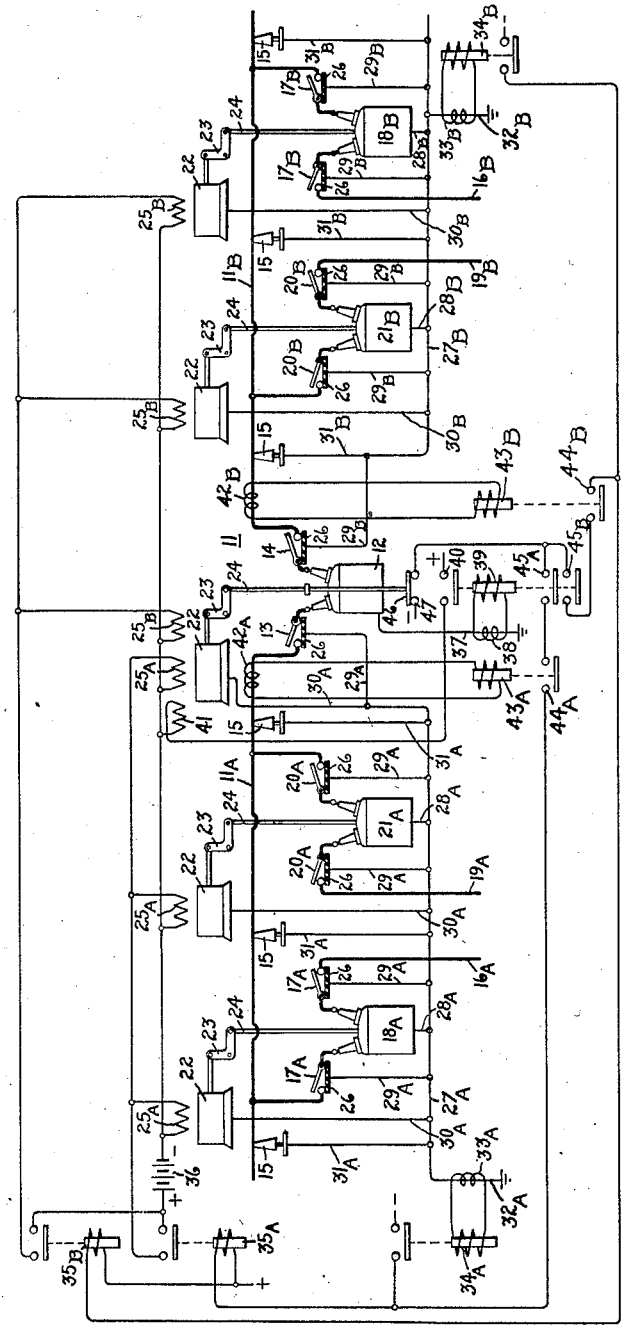
Inventor:
Harry R. Summerhayes,
by Harry E. Dunham
His Attorney.

Patented Feb. 9, 1943

2,310,753

UNITED STATES PATENT OFFICE 2,310,753

PROTECTIVE SYSTEM

Harry R. Summerhayes, Schenectady, N. Y., assignor to General Electric Company, a corporation of New York Application June 27, 1941, Serial No. 400,022

6 Claims. (Cl. 175—294)

My invention relates to protective systems which are particularly applicable to high-potential switching systems of the type in which the switches, bus bars, and the like are arranged in one or more sections whereby, in the event of trouble in one section, that section may be completely isolated from the rest of the system. Specifically, this invention is an improvement on my prior United States Letters Patent 1,759,765, granted May 20, 1930, and assigned to the same assignee as the present application.

Various means have been proposed for use in high-potential polyphase switching systems for reducing or eliminating the possibility of interphase short circuits. For example, the phases and apparatus associated with each have been isolated from each other in the case of outdoor switching stations by a wide separation thereof and in the case of indoor stations by the walls or the floors of the building in which the apparatus is housed. In other cases, the phase conductors have been isolated from each other by being separately enclosed, the conductors being insulated from the enclosing structures by liquid or solid insulating material. While the possibility of interphase short circuits in such systems is almost entirely removed, there still remains the danger, particularly when the system is supplied by a Y-connected source having a grounded neutral, of a fault from any phase to ground inasmuch as the various switches, switch-operating mechanisms, bus insulator supports, current transformers, etc., usually are grounded. In many cases, the phase conductors and devices connected to them have been enclosed in grounded metal compartments so that any arc in such an enclosure is bound to go to ground.

In Patent 1,759,765, there is disclosed a protective arrangement which may be applied to systems such as mentioned above or to other systems having one or more sections, which includes a separate ground bus for each section of the switching system and for each phase, in the case of a polyphase system, by which ground bus the grounding of the switches, the switch-operating mechanisms, the bus-insulating supports, the current transformers, etc., of that section is effected. When the switchgear is mounted in metal enclosures, the enclosures of each section are connected to and may form a part of the ground bus for that section. By suitable current-responsive devices in the separate ground buses, it is possible to cause the tripping of all the circuit breakers, which control the current flow to the section which is affected. The particular section, therefore, upon which the ground fault occurs is completely isolated from the rest of the system.

The various sections of the system to be protected, such as the bus sections, are usually interconnected by a tie circuit breaker which, according to my prior patent, was usually not connected to the ground bus in the same manner as the other apparatus involved on the theory that, if a fault should occur within this tie circuit breaker, the opening thereof would not relieve either section of the fault and it was necessary, therefore, to isolate both sections adjacent thereto.

Various schemes have been proposed for taking care of faults occurring in the protected section including the tie circuit breaker. It would be desirable, however, to provide a ground-fault protective scheme for a sectionalized system in which, if the fault occurred in one of the tie circuit breakers, the isolation of both sections adjacent thereto would not occur unless both sections were affected by the fault.

Accordingly, it is an object of my invention to provide a new and improved protective system for a sectionalized system for effecting the isolation of a minimum portion of the system should there occur a fault to ground on the system.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which the single figure thereof is a purely diagrammatic illustration of a sectionalized bus system involving my invention.

While I have chosen to illustrate only a single-phase conductor of the bus system, it will be understood by those skilled in the art that my invention is particularly applicable to a polyphase isolated phase bus system such as is disclosed in my prior patent referred to above. However, it should also be understood that my invention is not limited to a system of the isolated phase type. The drawing, therefore, is merely illustrative in character and is intended only to show one example of how I may carry out my invention.

Referring now to the drawing, I have illustrated only a single-phase bus conductor 11 comprising a plurality of sections, only sections 11<sub>A</sub> and 11B being shown, which are interconnected by tie circuit breaker 12. Since my invention is particularly concerned with protecting the zone of the sectionalized system comprising the tie circuit breaker 12, only portions of sections 11A and 11B have been shown but it should be understood by those skilled in the art that a more complete disclosure of the system is shown in my prior Patent 1,759,765 referred to above. Tie circuit breaker 12 has been illustrated schematically as an oil circuit breaker but it will be obvious that any other suitable type of circuit breaker may be used. Section 11A of conductor or bus 11 is connected to one terminal of tie circuit breaker 12 through disconnecting switch 13 while the other terminal of tie circuit breaker 12 is connected through disconnecting switch 14 to bus section 11B. It should be understood by those skilled in the art that any type of disconnecting switches may be used, those in the drawing being shown schematically for purposes of illustration only. Each of the respective sections 11A and 11B is supported on suitable insulators 15.

Connecting with bus section 11A, I have shown a feeder 16A, the connection being made through disconnecting switches 17A and circuit breaker 18A. Similarly, bus section 11B has connected thereto a feeder 16B through disconnecting switches 17B and circuit breaker 18B. Suitable current transformers may also be associated with feeders 16A and 16B but these have been omitted for the sake of clearness and simplicity in the drawing. Although only a single feeder circuit has been shown for each bus section, it will be understood that usually each section will supply numerous feeder circuits. Also, instead of having each feeder circuit connected directly with the main bus as illustrated, they may connect with group feeder buses which, in turn, connect with the main buses. Moreover, a main bus and an auxiliary main bus may be used for each phase instead of a single main bus as illustrated and, where group feeder buses are also used, each group feeder bus may selectively be connected to either the main bus or the auxiliary main bus of the corresponding phase. These arrangements and other well-known bus arrangements have not been illustrated since, for the sake of clearness, I deem it preferable to show the system in its simplest form.

Each of the bus sections 11A and 11B is also supplied from one or more suitable sources of power, not shown, through conductors such as 19A and 19B, disconnecting switches 20A and 20B, and circuit breakers 21A and 21B, respectively. Obviously, where main and auxiliary buses are used, means would be provided for connecting the source of power with either the main or auxiliary bus.

For operating the various circuit breakers 12, 18A, 18B, 21A, and 21B, as well as others not shown, I have shown diagrammatically similar operating mechanisms 22, each connected by a bell crank 23 and operating rod 24 with the individual circuit breakers. These operating mechanisms may be of any suitable form and will include means by which the circuit breakers controlled thereby may be tripped to the open-circuit position. For illustrative purposes, I have shown the operating mechanisms 22 associated with circuit breakers 18A and 21A as provided with trip coils 25A which are adapted when energized to cause the circuit breakers associated therewith to trip open. Similarly, the operating mechanisms 22 associated with circuit breakers 18B and 21B are provided with trip coils 25B. Since tie circuit breaker 12 must operate to isolate section 11A or 11B in the event of a fault on one or the other of these sections, the operating mechanism 22 associated therewith is provided with a trip coil 25A and a trip coil 25B, the trip coil 25A being energized simultaneously with the energization of the other trip coils designated by the same reference numeral and subscript while the trip coil 25B is energized simultaneously with the energization of the other trip coils designated by the same reference numeral and subscript. I have purposely omitted showing any operating mechanism for the various disconnecting switches 13, 14, 17, and 20, as these switches may be operated in any well-known manner and, to illustrate an operating mechanism therefor would unnecessarily complicate the drawing. Accordingly, I have merely illustrated these disconnecting switches as comprising a base member 26.

In accordance with my prior patent referred to above, I have provided a ground bus 27A for bus section 11A and a ground bus 27B for bus section 11B. If more than one phase conductor were provided for each bus section, there would also be a separate ground bus for each phase. Each ground bus, which should be of relatively large capacity and firmly connected to the station ground, is electrically connected with the circuit breaker frames or bases, the disconnecting switch bases, the pins or bases of the bus-supporting insulators, the circuit breaker operating mechanisms, and any other normally grounded part of the apparatus associated with the particular bus phase section to which that ground bus belongs. These connections should be made by conductors of suitable size to carry the fault current. For example, ground fault bus 27A is shown connected with the bases of circuit breakers 18A and 21A by conductors 28A, with the bases of the disconnecting switches 13, 17A, and 20A by conductors 29A, with the operating mechanisms 22 associated with circuit breakers 12, 18A and 21A by conductors 30A, and with the pins and bases of the insulators 15 supporting main bus section 11A by conductors 31A. Similarly, the various portions of bus section 11B are connected to ground fault bus 27B by conductors designated by the same reference numerals designated with the subscript B instead of A. It is to be understood that, by the term "bases," I refer to all those parts of the respective apparatus which are insulated from the current-carrying parts of the apparatus and which are usually grounded. As will be described in greater detail hereinafter, the base of tie circuit breaker 12 is not connected to either of the ground buses 27A or 27B.

Ground buses 27A and 27B are connected to ground by leads 32A and 32B, respectively. In ground lead 32A there is provided a current transformer 33A and in ground lead 32B there is provided a current transformer 33B. The secondary winding of current transformer 33A is connected to a ground fault relay 34A while the secondary winding of current transformer 33B is connected to a ground fault relay 34B. Ground fault relay 34A when energized completes the energization circuit for auxiliary tripping relay 35A which, in turn, closes contacts for energizing trip coils 25A from a source of potential illustrated as a battery 36. Similarly, energization of ground fault relay 34B completes the energization circuit for auxiliary tripping relay 35B which, through suitable contacts, controls the simultaneous energization of trip coils 25B.

With the protective apparatus described thus far, should a fault to ground occur in any section of bus 11 as, for example, at one of the bus-supporting insulators 15 or in one of the feeder circuit breakers 18, the current in flowing to ground by way of the ground bus of that phase and section will operate one of the ground fault relays 34 to cause operation of one or more of the auxiliary tripping relays 35, whence the tripping coils 25A or 25B of all the circuit breakers connected to the particular section in which the fault occurred are energized and the circuit breakers tripped to the open position. The arrangement described thus far is disclosed and claimed in my prior patent referred to above and, consequently, no further description of the operation thereof will be included herewith.

In the event of a fault occurring in the zone of the sectionalized bus system comprising tie circuit breaker 12, heretofore, it was necessary to isolate both bus sections 11A and 11B. However, a fault in this zone might not necessarily involve both sections 11A and 11B and, in accordance with my invention, I have provided selective means for determining whether such a fault involves one or both of the sections as well as to remedy the situation by isolating only a minimum portion of the system which is affected. I have provided bus tie circuit breaker 12 with a separate ground fault connection 37 having associated therewith a current transformer 38 with its secondary winding connected so as to energize relay 39. Relay 39 is provided with means for controlling contacts 40 connected in series with a trip coil 41 associated with operating mechanism 22 of bus tie circuit breaker 12. Upon the occurrence of a ground fault in bus tie circuit breaker 12, contacts 40 will be closed by relay 39, whereupon trip coil 41 is energized to open bus tie circuit breaker 12. In order to provide the desired selectivity for determining whether bus section 11A or 11B or both are involved in a fault occurring in bus tie circuit breaker 12, I provide a current transformer 42A associated with bus section 11A closely adjacent one terminal of bus tie circuit breaker 12 and a current transformer 42B associated with bus section 11B closely adjacent the other terminal of bus tie circuit breaker 12. The secondary windings of current transformers 42A and 42B are connected to energize selective relays 43A and 43B, respectively, which control contacts 44A and 44B, respectively. Relay 39, in addition to controlling contacts 40, also controls normally open contacts 45A and 45B. Contacts 44A and 45A are connected in series with one another and in series with auxiliary tripping relay 35A. Similarly, contacts 44B and 45B are connected in series with one another and in series with auxiliary tripping relay 35B. The operating rod 24 of bus tie breaker 12 also controls an auxiliary switch 46 for bridging contacts 47 which are connected in series with either contacts 44A and 45A or 44B and 45B.

Whenever a fault occurs in tie bus circuit breaker 12, relay 39 will be energized to bridge contacts 40 and, consequently, cause bus tie circuit breaker 12 to assume its open circuit position, whereupon auxiliary switch 46 bridges contacts 47. If, after bus tie circuit breaker 12 is open, ground fault current continues to flow so as to maintain relay 39 in the closed position, so that contacts 40, 45A, and 45B are closed, then one or more of the bus sections 11A or 11B are affected by this fault and selective relays 43A or 43B or both will be energized. If selective relay 43A is energized, indicating that power from bus section 11A is feeding the fault, contacts 44A will be bridged energizing auxiliary tripping relay 35A and causing tripping of circuit breakers 18A and 21A. If the fault involves bus section 11B, selective relay 43B will be energized to cause tripping of circuit breakers 18B and 21B. It will also be observed that both sections 11A and 11B will be simultaneously cleared by the protective system embodying my invention if selective relays 43A and 43B indicate that both sections adjacent bus tie breaker 12 are still affected by the fault after the bus tie breaker has been opened. Also, in the event that the fault only involved one section until that section was cleared and subsequently involved the other section, the second section would also be cleared as soon as this occurred.

It will be observed, therefore, that I have provided an arrangement for permitting both sections adjacent tie circuit breaker 12 to be isolated in the event of a fault within bus tie breaker 12 only if both sections are involved, thereby maintaining the isolated portion of the apparatus under fault conditions at a minimum.

While I have described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination with a sectionalized alternating-current system including tie circuit-interrupting means for interconnecting adjacent sections of said system, each of said sections being provided with a feeder circuit and a source of power connected thereto, means for isolating a section of said system upon the occurrence of a fault thereon, and a fault responsive protective system for said tie circuit-interrupting means for causing opening of said tie circuit-interrupting means and for initiating the isolation of only the section adjacent thereto still affected by said fault after opening of said tie circuit-interrupting means.

2. In combination with a sectionalized alternating-current system including tie circuit-interrupting means for interconnecting adjacent sections of said system, a fault responsive protective system for said tie circuit-interrupting means including means for causing opening of said tie circuit-interrupting means upon the occurrence of a fault in said tie circuit-interrupting means, and means selectively operable to isolate only the section connected to said tie circuit-interrupting means which is affected by the fault in said tie circuit-interrupting means after opening thereof in the event that only one adjacent section is affected by such fault after opening of said tie circuit-interrupting means.

3. In combination with a sectionalized alternating-current system including tie circuit-interrupting means for interconnecting adjacent sections of said system, a ground-fault protective system for said tie circuit-interrupting means comprising an electroresponsive device for causing opening of said tie circuit-interrupting means upon the occurrence of a ground-fault therein, a relay associated with each of the sections adjacent said tie circuit-interrupting means for determining whether that section is affected by fault current supplied to said tie circuit-interrupting means, and means for isolating either or both of the sections adjacent the tie circuit-interrupting means when said tie circuit breaker has been opened and either or both of said relays associated with the adjacent sections indicates that the fault in said tie circuit-interrupting means is still being fed from either or both of said adjacent sections.

4. In combination with a sectionalized alternating-current system including tie circuit-interrupting means for interconnecting adjacent sections of said system, each of said sections being provided with a feeder circuit and a source of power, ground-fault protecting means for selectively isolating sections of said system upon the occurrence of a fault thereon, a separate ground-fault protecting means for said tie circuit-interrupting means comprising an electroresponsive device for causing opening of said tie circuit-interrupting means upon the occurrence of a ground-fault therein, a selector relay associated with each of the sections adjacent said tie circuit-interrupting means responsive to current flowing in said section adjacent said tie circuit-interrupting means, and means for isolating only one of said sections adjacent to said tie circuit-interrupting means in the event that the selector relay associated with said one adjacent section indicates that fault current is flowing only in that section adjacent said tie circuit-interrupting means after said tie circuit-interrupting means has been opened.

5. In combination with a sectionalized bus system including tie circuit interrupters for interconnecting adjacent sections and other circuit interrupters respectively connected to said sections, means responsive to a fault of a predetermined character on any section for effecting the opening of all of the circuit interrupters connected thereto, means responsive to a fault of a predetermined character in a tie circuit interrupter for effecting the opening thereof, and means responsive to the opening of a tie circuit interrupter and the flow of fault current from an adjacent bus section to a faulty tie interrupter for opening the other circuit interrupters in such adjacent bus section.

6. In combination with a sectionalized bus system including tie circuit interrupters for interconnecting adjacent sections and other circuit interrupters respectively connected to said sections, means responsive to a fault of a predetermined character on any section for effecting the opening of all of the circuit interrupters connected thereto, means responsive to a fault of a predetermined character in a tie circuit interrupter for effecting the opening thereof and for initiating the opening of the other circuit interrupters connected to only the bus sections adjacent to the opened tie circuit interrupter which supply fault current to the faulty tie circuit interrupter after the opening thereof.

HARRY R. SUMMERHAYES.